United States Patent [19]

Braun et al.

[11] Patent Number: 4,595,839

[45] Date of Patent: Jun. 17, 1986

[54] BIDIRECTIONAL OPTICAL ELECTRONIC CONVERTING CONNECTOR WITH INTEGRAL PREAMPLIFICATION

[75] Inventors: Steven W. Braun, Encinitas; Henri Hodara, Altadena, both of Calif.

[73] Assignee: Tetra-Tech, Inc., Pasadena, Calif.

[21] Appl. No.: 734,805

[22] Filed: May 15, 1985

Related U.S. Application Data

[63] Continuation of Ser. No. 431,574, Sep. 30, 1982.

[51] Int. Cl.$^4$ ............................................. G02B 6/42
[52] U.S. Cl. .................................... 250/551; 250/227; 455/612; 350/96.20; 350/96.23
[58] Field of Search ............... 250/551, 227, 239; 350/96.15, 96.17, 96.18, 96.20, 96.23; 455/610, 612, 613

[56] References Cited

U.S. PATENT DOCUMENTS

| | | | |
|---|---|---|---|
| 3,792,284 | 2/1974 | Kaelin | 250/551 |
| 3,878,397 | 4/1975 | Robb et al. | 250/551 |
| 3,883,681 | 5/1975 | Campbell | 350/96.20 X |
| 4,144,530 | 3/1979 | Redfern | 350/96.23 X |
| 4,360,729 | 11/1982 | Harvey et al. | 250/227 |
| 4,408,307 | 10/1983 | Harris | 455/601 |

FOREIGN PATENT DOCUMENTS 2479618  10/1981  France ............... 455/613

*Primary Examiner*—Edward P. Westin
*Attorney, Agent, or Firm*—Peter I. Lippman

[57] ABSTRACT

A pair of connectors that convert electrical signals into optical signals for transmission along an optic fiber, and that also convert optical signals received from an optic fiber into electrical signals, is combined with a two-optic-fiber cable to provide an interconnecting cable assembly that receives electrical signals from a sending apparatus at either end of the cable, and presents electrical signals to a receiving apparatus at the other end of the cable, although the intervening transmission is optical. One optic fiber optically links the electrical-to-optical converter (light emitter) in one connector to the optical-to-electrical converter (light detector) in the second connector, while the other optic fiber optically links the emitter in the second connector to the detector in the first connector; thus the cable assembly is bidirectional and may be laid down and connected in either orientation with equivalent performance. Preamplification and buffering is provided within each connector, for the optical-to-electrical conversion. Simple, easy to use, but very accurate alignment devices for juxtaposing the optical fibers to the sources and detectors permit rapid but reliable replacement of the cable. Such cable assemblies are advantageous in collecting data for seismic geomapping for petroleum, particularly when electrical wires too are in the cable assembly.

13 Claims, 12 Drawing Figures

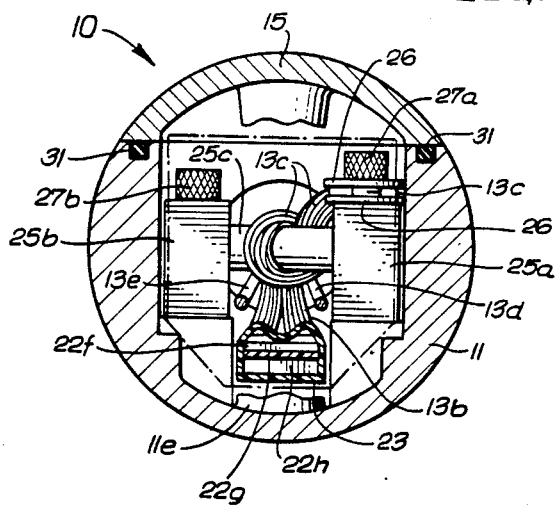
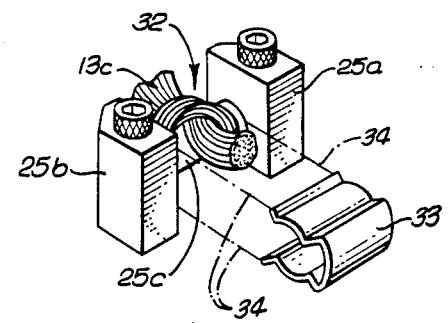
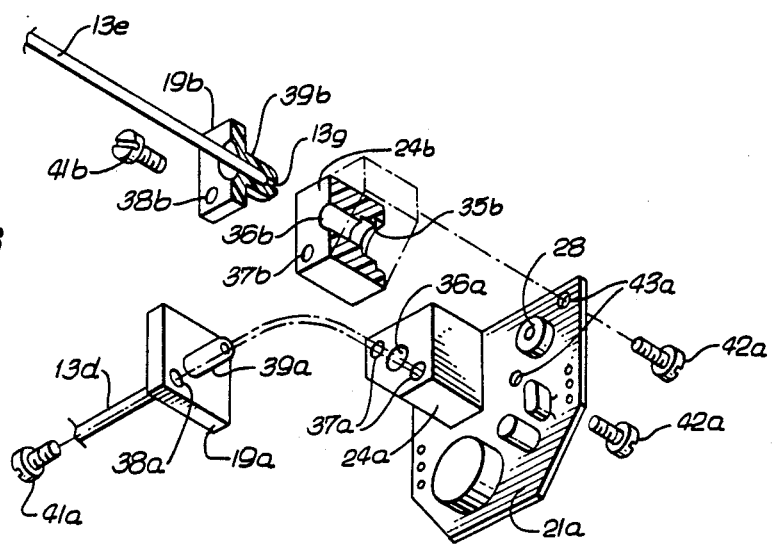

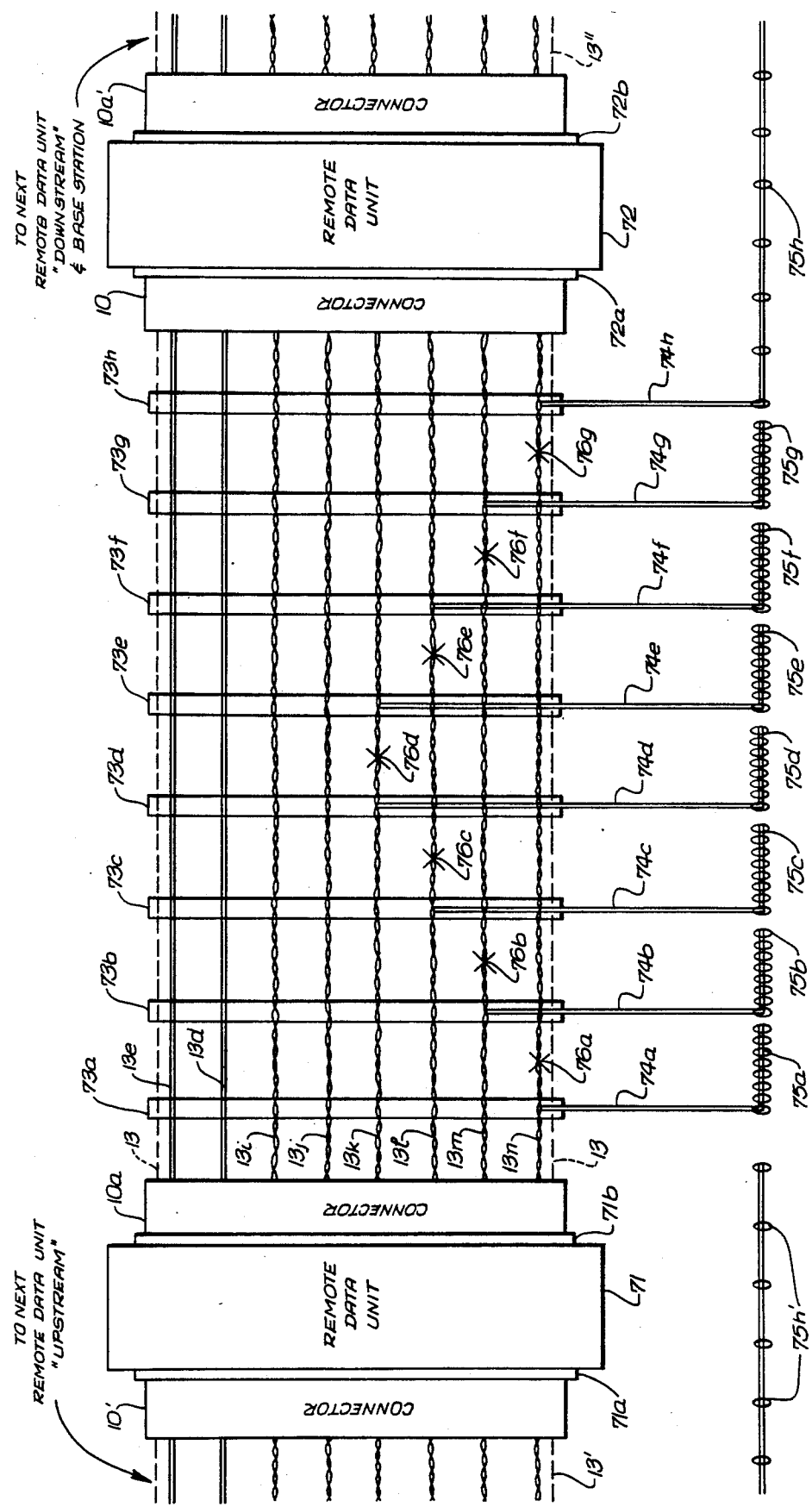

BIDIRECTIONAL OPTICAL ELECTRONIC CONVERTING CONNECTOR WITH INTEGRAL PREAMPLIFICATION

This is a continuation of co-pending application Ser. No. 431,574 filed on Sept. 30, 1982.

BACKGROUND OF THE INVENTION

1. Field

This invention relates generally to cables for transmitting data in the form of optical signals between electronic apparatuses, and in particular relates to cables for transmitting large amounts of data over long distances in temporary field operations of such a character that radio communications are impractical.

Specifically, the invention has application for cables that are used both (1) to collect seismic information from an array of many sensors spaced apart by only a few dozen feet or yards, and at the same time (2) to relay information between electronic apparatuses that service subgroupings of such sensors along the array, multiplexing the locally collected information for incorporation into an aggregate signal for transmission to a base station. The invention is not, however, limited to such application.

In such seismic exploration, problems of equipment weight, environmental interference with signal integrity, simplicity in use, field reliability, and ease of service under rugged field conditions when malfunctions do arise, can become paramount—even when extremely high-technology techniques have been built into the data-generation and data-interpretation operations.

The constraint of equipment weight in field operations favors use of optic fibers for transmission of as much data as possible, since optic fibers are extremely "fast" data-transmission links and are made of fine plastic or glass, and thus are very light in weight compared to electrical coaxial cable of comparable multiplex data-carrying capacity. The constraint of signal interference likewise favors use of optic fibers for transmission over the longest distances that may be involved, since such fibers are completely insensitive to electrical interference sources.

Effective use of optic-fiber cabling in rough field environments, however, requires solution of the other types of problems mentioned above.

For one thing, it is undesirable to make field connections between optical surfaces, on a wholesale basis, because optical interfaces are subject to contamination by fine dirt and dust.

For another, it is essential that when cabling is damaged—so that replacement/repair with some exposure of optical surfaces becomes necessary—the cabling be replaceable with a minimum of "fine work" or sophistication, and a maximum of reliability.

For yet another, because the cost of setting up such operations is extremely high, it is also desirable that installation be made as quick and as insensitive to ordinary human error as possible.

2. Prior Art

The closest prior device of which we are aware is disclosed in U.S. Pat. No. 3,792,284, issued to Oscar J. Kaelin. That device has a light emitter in one connector and a light detector in another, with an optical-fiber-containing cable interconnecting the two—so that light from the emitter is presented to the detector.

Kaelin's light detector is electrically connected directly to the pins of an electrical connector that is adapted to mate with a corresponding electrical connector of a receiving apparatus.

His detector and emitter are inserted into alignment sleeves that face the respective openings in his respective connector housings, and the optical-fiber cable ends are led into both housings and inserted so that the optical surfaces butt against the detector and emitter, respectively; the cable ends are then clamped in those respective positions.

The clamping serves the purpose of holding the cable ends juxtaposed to the detector and emitter, and it also serves the purpose of bearing any tensile force that may be applied between the cable and the connector.

It will be apparent that, barring cable damage, Kaelin's device resolves at least part of the problem of cable weight, and also the problem of making optical connections in the field, since the connectors of his cable are both electrical connectors.

If cabling were damaged and it became desirable to replace cable but use the same connectors, however, Kaelin's device could be less than ideal. Replacement requires having an optic-fiber cable with an optic fiber whose optical surface is flush with the end of the bulk cable and yet is of good optical quality and clean. Moreover, several inches of each end of the cable must be inserted into a connector precisely the correct distance so as to butt against the corresponding optical device to form a reliable optical interface for data transmission—but not to jam against the optical device and so misalign it, or damage either it or the fiber face.

Further, if Kaelin's clamp is tightened enough to reliably bear any tensile force that may arise between the cable and the connectors under field conditions, distortion of the optical-fiber cable end may arise sufficient to misalign the optical interface, as can be seen from Kaelin's drawing.

In addition, because Kaelin's detector is wired directly to the electrical connector, the high-impedance signal from the detector must pass through the connector interface into the receiving apparatus. Along that route of several inches—if Kaelin's device were used under the type of field conditions that are being considered here—the detector signal would be subject to electrical interference both from the environment and from the multiplexing electronics in the receiving apparatus.

Further, as Kaelin points out at column 2 lines 40 through 43 of his patent, necessarily with his device "[t]he connector pins 14 and 15 are arranged differently so as to identify the electrical input from the electrical output and to prevent improper connection to mating receptacles." This provision would of course defeat the consummation of human error in actually connecting his cable in the wrong orientation, but it does not defeat the preparatory stage of that same error—that is to say, it does not prevent the installer from laying out the cable over perhaps a mile of rugged terrain before discovering that it was lying backwards.

Thus, while the Kaelin device is undoubtedly useful for a variety of purposes, it would not be eminently suitable for the kinds of applications here under discussion. The present invention is aimed at providing a cable assembly that would obviate the above-described disadvantages of the Kaelin device for these applications, and that also would be more generally useable and useful with convenience, reliability, and high-fidelity data-transmission performance in a great variety of other applications.

BRIEF SUMMARY OF THE INVENTION

The invention may be viewed as a bidirectional cable assembly that links a first and a second apparatus which intercommunicate by respectively transmitting and receiving electrical signals to and from the cable assembly. The first and second apparatuses each have respective electrical connector means—that is to say, typically, conventional multipin electrical half-connectors, although other means could be employed—for mating with the cable assembly to effect such transmitting and receiving.

The cable assembly itself, in this view, has throughout its length two optic fibers for transmitting optical signals along the length of the cable. It also has along its length exterior protective elements—that is to say, typically, conventional sheathing.

At each end of the cable is a connector that has a housing, and mounted within the housing a light emitter and a light detector. Each connector also has an electrical pin subassembly that is adapted to mate with the electrical connector means of either of the two apparatuses.

This electrical pin subassembly may, like the electrical connector means of the two apparatuses, be a conventional multipin half-connector that is adapted to engage the half-connectors of the apparatuses. It is to be understood, however, that the same electrical "pin" subassembly that has been for convenience so called may instead be some currently nonconventional or nonexistent connecting device that in some other way mates with the electrical connector means of either of the two apparatuses, to perform the equivalent function of transmitting electrical signals to and from the two apparatuses respectively, and does not necessarily actually have electrical "pins".

Each connector also has means for optically coupling the optical fibers to the emitter and detector. This must be done in such a fashion that the emitter of each connector is optically coupled via one optical fiber to the detector of the other connector.

In addition, of course, within each connector there must be operational electrical connections between the emitter and the pin subassembly, and between the detector and the pin subassembly.

By the foregoing provisions the cable assembly is made capable of operation "either end to"—and accordingly it is possible and may typically be desirable to make the sending and receiving apparatus connector means functionally identical to each other, and likewise the electrical pin subassemblies at the two connectors functionally identical to each other. In this way the cable assembly is made capable not only of operation "either end to" but also of installation "either end to," thus permitting full realization of the benefits of the assembly's bidirectional character.

Advantageously the above-mentioned operational electrical connections within the connector housings may comprise active electronic circuitry that preprocesses electrical signals from the detector, and applies the signals, after the preprocessing, to the pin subassembly. This electronic circuitry can provide amplification and buffering that renders the detector signal less subject to interference by environmental electrical sources, before the detector signal passes through the two connector halves and enters the receiving apparatus, and less subject to crosstalk or other types of signal degradation after it is within the receiving apparatus. In this way the overall system performance is rendered more reliable and better independent of field conditions as well as unanticipated operational deviations within the receiving apparatus.

The invention may further include novel provisions for juxtaposing the optic-fiber faces to the detector and emitter in each connector in such a way that the cable can be relatively quickly replaced using the same connectors, but with a reasonable guarantee of proper alignment and correct mechanical installation, regardless of reasonably anticipated levels of tensile force that may arise between the cable and one or both connectors.

Such provisions may include in each connector housing two alignment guides adapted to be accurately and stably positioned relative to the detector and emitter respectively. It is further contemplated that one end of the cable extend into the connector housing, with the exterior protective elements removed from a portion of the cable within housing so that the optical fibers are bared along a portion of their length within the housing near their ends. Likewise is contemplated the related provision of two positioning ferrules respectively secured to the ends of the respective fibers, but with the end faces of the fibers exposed. This securing may be effected by cementing the fibers into the ferrules, and then completing the optical finishing of each fiber with the ferrule already attached; or in other acceptable ways. The ferrules should be adapted to mate with the alignment guides, and to be secured relative to the guides, to effect quick but accurate and stable alignment of the fiber end faces with the detector and emitter respectively.

An additional advantageous feature that is related to alignment and may be regarded a part of the invention is to make triple use of the carrier boards that support the electronic circuitry: besides (1) supporting the electronic circuitry, the boards can also (2) support the detector as well, so that the detector—which, of course, must be integrated into the electronic circuitry anyway—in effect is treated as just another electronic component for manufacturing purposes (yielding production simplicity advantages). Finally, the boards can also (3) support the alignment guide. If preferred, only the second and third of these two functions can be performed by a mechanical carrier separate from the circuit boards, with wiring interconnecting the boards and the detector. With such an arrangement, of course, only a limited part of the advantages of the triple-use arrangement would be obtained.

Such provisions for reliable alignment and installation independent of anticipated tensile force may also include a strength member within the cable—such as fibers of the material now available under the trade name "Kevlar"—that bears substantially all of any tensile force applied along the cable.

Interacting with this strength member is a stanchion firmly fixed within the respective housing of each connector. The stanchions are adapted for operational engagement with the strength member so as to bear any tensile force that may be applied between that connector housing and the cable; for example, each stanchion may be adapted to have the strength member wrapped around it.

Also within each connector are means for securing the strength member to the stanchion. Such means may, for example, be a circlip that prevents a strength member from coming unwrapped from a stanchion; or preferably it may be in the form of an anchor screw with suitable washers or the like for holding the end of a strength member so that the latter cannot come unwrapped.

The invention may also include incorporating within the optical-fiber cable a plurality of electrical wires for transmitting electrical impulses that are "locally" collected to the two apparatuses. That is to say, if there are electrical-impulse-generating devices arrayed along the terrain between the two apparatuses, these impulse generators may not emit signals that are properly formatted for incorporating into the optical signal that is passing along the optic fibers. The impulses from these impulse generators are to be collected at the nearer of the two apparatuses, for formatting and incorporation into the optical signal that passes to yet other apparatuses.

These electrical wires incorporated into the cable can be readily tapped to provide access to these information impulses, by providing also a plurality of electrical connectors disposed along the length of the cable and connected to the electrical wires. In this way it is possible to provide operative electrical connection of the electrical-impulse-generating devices to the electrical wires.

Completing this aspect of the invention are, fixed within each connector housing, electrical connection means for interconnecting the electrical wires with the so-called electrical pin subassembly, so as to transmit such electrical impulses from the impulse-generating devices to the appropriate apparatus. These electrical connection means may be, for instance, simple multipin connectors similar to those used in plugging integrated chips into circuit boards.

In another view of the invention, a single one of the connectors described above may be regarded as embodying the invention, with the cable, its prepared ends, and the connector at the other end of the cable all considered as part of the context in which the invention operates.

On the other hand, a third alternative view of the invention may be taken that encompasses more, rather than less, of the overall operating system. In this view the invention is an information collection system for substantially simultaneously collecting phenomenological information over a broad geographic area. By phenomenological information is meant information about physical phenomena, which may be seismic subsurface-geomapping information or it may be other kinds of information entirely.

In this view the information collection system of the invention includes a plurality of sensors responsive to such phenomena, and adapted to be arrayed over such area in groups and to generate in response to such phenomena electrical impulses having information content related to such phenomena. The system also includes a plurality of "remote data units," and a plurality of cables. The "remote data units"—corresponding to the sending and receiving devices discussed above—are adapted to be located in a broad geographic area under field conditions, and provided with their own respective power supplies. Each remote data unit is to be associated with a particular group of the sensors for collection of electrical impulses from that group, and is adapted to receive such electrical impulses from its respective group, and to digitize and time-multiplex such information content. The remote data units are also adapted to be connected in series with each other. Moreover, each remote data unit—except, permissibly, with the one unit that is at the "upstream" (with respect to information flow) end of the series—is also adapted to:

(1) receive information in a time-dependent format via first electrical connector means (that is, via a receiving connector, as previously discussed), (2) impress such time-multiplexed information content upon a common electrical signal with such received information from that one adjacent remote data unit, and (3) present the new composite or common electrical signal at second electrical connector means (that is, via a sending connector, as previously discussed) for transmission to the other adjacent remote data unit in the series.

As to the cables, each is adapted for interconnecting one adjacent pair of the remote data units. Each cable has:

(1) two optical fibers, for transmitting optical signals corresponding in time-multiplexed information content to the common electrical signal presented for transmission between those two adjacent remote data units, (2) an optical emitter, optically coupled to one end of the two optical fibers, for generating and transmitting into that fiber optical signals that correspond to the common electrical signal received at the "second" electrical connector means of one of those two adjacent remote data units, (3) an optical detector, optically coupled to the other common electrical signal in response to the optical signals received via the optical fiber at the "first" electrical connector means of the other of those two adjacent remote data units, and (4) a redundant optical detector and emitter, similarly coupled to the ends of the other optical fiber but in the opposite sense, for transmission of information in the opposite direction relative to the cable itself.

As a result of all of these provisions, as already explained, inadvertent (or deliberate) reversal of any of the cables end-for-end as between its two corresponding remote data units has no effect upon the operation of the system—except, of course, for the direction of information transmission within and relative to that cable or those cables that are reversed, and this exception is plainly inconsequential.

In yet another view of the invention, it may be seen as a method of transmitting signals between two apparatuses. In this view, of course, the two apparatuses are assumed to have input electrical connector means and output electrical connector means, both as previously defined. The method consists of first presenting the signals in electrical form at the output electrical connector means of a "first" one of the two apparatuses, and receiving those signals in the same electrical form from the output electrical connector means at a "first" electrical pin subassembly in a "first" connector housing, which is disposed at a first end of an interconnecting cable.

Next the method proceeds with converting the signals into optical form, applying them in optical form to an optical fiber for transmission along the cable, and receiving the signals in optical form in a "second" connector housing, that is disposed at a second end of the same interconnecting cable.

The following group of substeps is performed entirely within the second connector housing—converting the signals from optical into electrical form, buffering and amplifying the signals in the electrical form, if desired generating a status code that indicates when signals are in fact present, and applying the signals after the buffering and amplifying, and also applying the electrical status code if present, to a second electrical connector assembly in the second connector housing.

(The generation and use of the electrical status code, which of course could be considered part of the hardware views of the invention previously discussed as well as part of this method view, makes it possible to have the receiving apparatus in a quiescent condition, sensitive only to the presence or absence of the status code, and to have the receiving apparatus automatically switch on its full operational capabilities when the status code indicates that phenomenological data are present in the other signal.)

The last step is to receive the signals in electrical form from the "second" electrical pin subassembly at the input electrical connector means of the other one of the two apparatuses.

All of the foregoing apparatus and method features will be more fully appreciated upon consideration of the following detailed description, with reference to the appended drawings, of which:

BRIEF DESCRIPTION OF THE DRAWINGS

FIG. 4 is a sectional end elevation taken along the line 4—4 of FIG. 3.

FIG. 5 is a fragmentary perspective view showing an alternative (relative to FIGS. 2 through 4) embodiment of a particular detail—the securing of the otherwise loose end of the cable strength member.

FIG. 6 is a perspective view, partly in section, showing prefered details of the mounting and alignment provisions for interconnecting the electronic circuitry, detector, emitter, and optical fibers of the cable assembly of FIGS. 1 through 5.

FIG. 12 is a general system diagram of an information collection system in which the cable assembly of FIGS. 1 through 11 has particular advantageous application.

DETAILED DESCRIPTION OF THE PREFERRED EMBODIMENTS

1. MECHANICAL AND OPTICAL FEATURES

Figure 1:
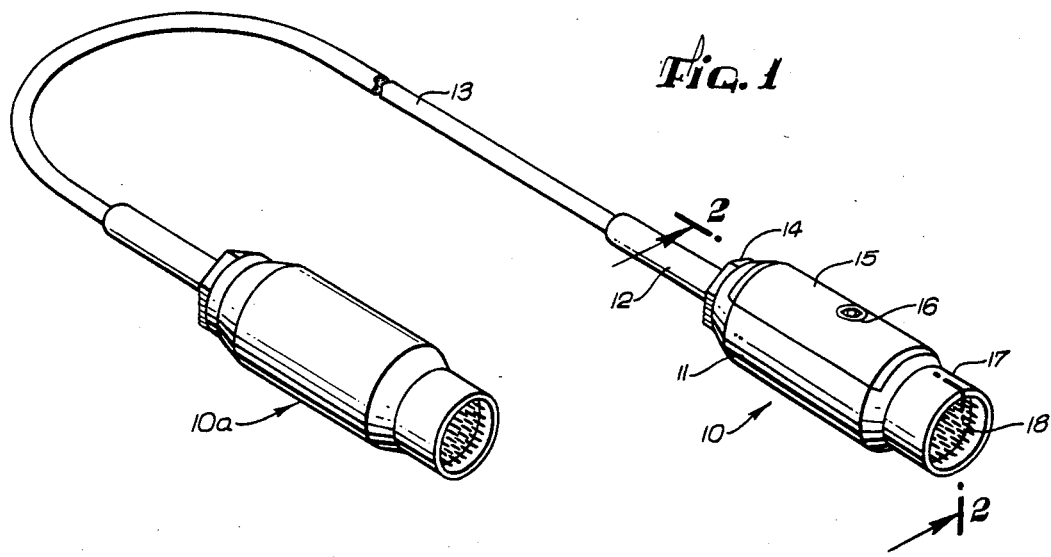
FIG. 1 is a perspective view of a cable assembly in accordance with our invention, with part of the cable length omitted for convenience of illustration.

FIG. 1 shows a cable assembly that is a preferred embodiment of our invention. It is made up of optical-fiber cable 13 and two substantially identical terminating connectors 10 and 10a. (For convenience only connector 10 will be discussed in detail, and it is to be borne in mind that connector 10a has all of the same mechanical and operating features and is internally connected so that the emitter in each connector is optically linked to the detector in the other.)

Connector 10 has a housing 11, a sealing gland and protective stiffness element 12, and a hex nut 14 that screws into one end of the housing 11 to slightly compress the sealing gland—to maximize the environmental sealing function of the gland without restraining the cable significantly. The housing 11 also has a cap or cover 15, held in place by a screw 16, and conventional half-connector portion that consists of an electrical pin subassembly 18, which is threaded into the other end of the housing 10 and which retains in place a knurled gripring 17. The gripring conceals the threads of the pin subassembly and is also secured against rotation by a setscrew which jams those threads to prevent undesired loosening of the pin subassembly in the field.

The electrical pin subassembly 18 is adapted to mate with electrical connector means (not shown) of "remote data units" defined above, or some other sending or receiving apparatus.

Figure 2:
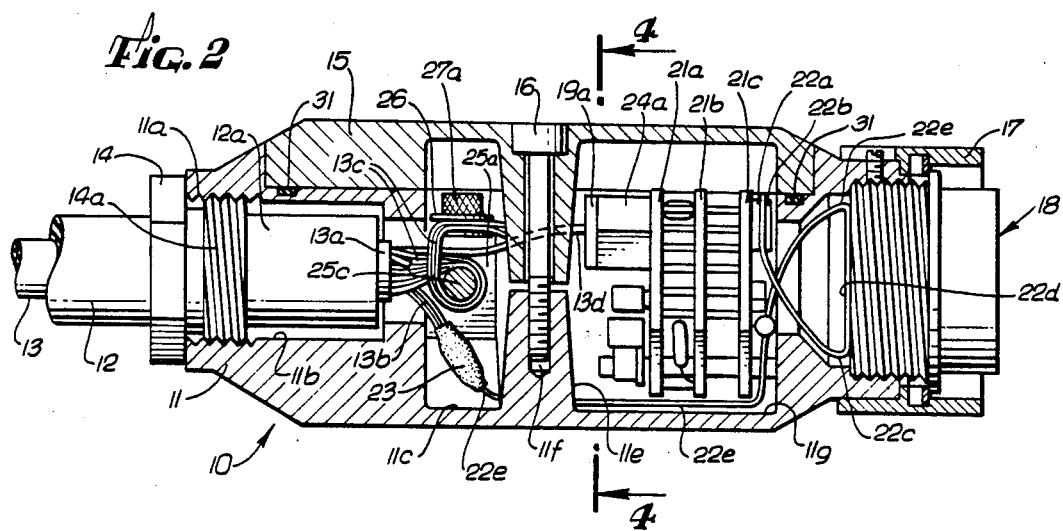
FIG. 2 is a sectional side elevation taken along the line 2—2 of FIG. 1, showing the internal details of one connector in accordance with our invention.
Figure 3:
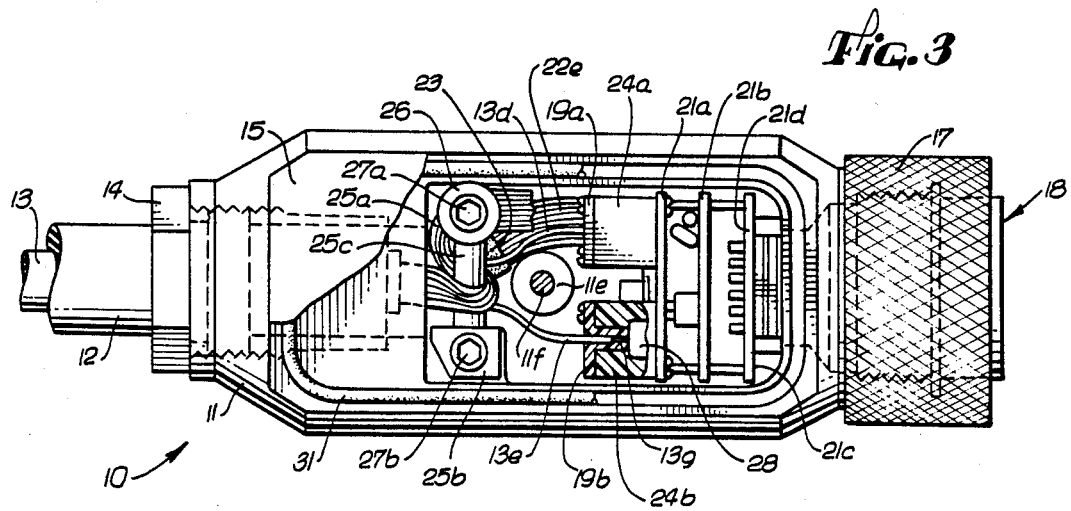
FIG. 3 is a plan view of the same connector, with its cover removed, and partly in the phantom line.

FIGS. 2 through 4 show all of the same elements (except connector 10a), and in addition the internal components of the connector 10.

In particular, the cable 13 is shown as terminating within the housing 11 in an end of its exterior protective portion 13a, stripped away to expose bared within the housing 11 three interior portions of the cable: (1) the two optical fibers 13d and 13e, (2) six electrical twisted-wire pairs 13b, and (3) a strength member 13c which may be of the type known commercially as Kevlar.

The optical fibers 13d and 13e are terminated respectively by individual positioning ferrules 19a and 19b, to which the fibers are appropriately secured as by cementing them into the ferrules. Such a method of securing may be particularly advantageous since it permits finishing the optical faces of the fibers by grinding and polishing each fiber and its associated ferrule end together.

Each ferrule has a rectangular or square flange with mounting-screw holes to aid in properly orienting the ferrules and in securing the ferrules to their respective alignment guides 24a and 24b. Close inspection of FIGS. 3 and 6 will reveal that the portions of the optical fibers that appear at points 13d and 13e in the drawings are actually the plastic jacketing of the fibers, which is stripped away only near the very tips of the fibers to expose the inner functional cores 13g.

The "receiving" fiber 13e, 13g is thus brought into juxtaposition with an optical detector 28 that is covered by the corresponding alignment guide 24b. The alignment guide is internally contoured at 35b (FIG. 6) to match the detector, for very easy but very precise orientation of the positioning ferrule 19b with respect to the detector 28. The positioning ferrule 19b has a cylindrical portion 39b adapted for snug but smooth sliding insertion into the through-hole 36b formed in the alignment guide 24b, and a pair of screw holes (one not shown, the other 38b) for use in fastening the ferrule 19b to the alignment guide 24b by two mounting screws (only one shown) 41b.

The alignment guide 24b has two corresponding threaded through-holes (only one shown, the other 37b) to receive these mounting screws. The other ends of these same two threaded through-holes 37b in the alignment guide 24b are used in fastening the alignment guide 24b to an electrical circuit board or carrier 21a, on which the detector 28 itself is also mounted, using two additional mounting screws 42a (inserted from the rear). In this way the electronic circuitry, the detector, and the optical fiber are all conveniently and securely carried together on the circuit board or carrier 21a, and it is not necessary for the latter to be firmly fixed in position relative to the housing 11.

In similar fashion the "sending" fiber 13d is secured in positioning ferrule 24a, and brought into proper juxtaposition with an optical emitter (not shown) that is covered by alignment guide 24a. This second alignment guide 24a is also for convenience similarly mounted to the electronic board 21a by mounting screws that screw into threaded through-holes 37a from the back, as in the case of the "receiving" elements, and the corresponding positioning ferrule 24a is secured to alignment guide 24a by mounting screws (only one shown) 41a.

Since no active electronics need be provided within the connector housing 11 for excitation of the light emitter, it is not as particularly advantageous to have the light emitter mounted on the carrier with the electronics (it could be mounted elsewhere, with separate electrical leads from the electrical pin subassembly 18), but it is convenient.

Figure 7:
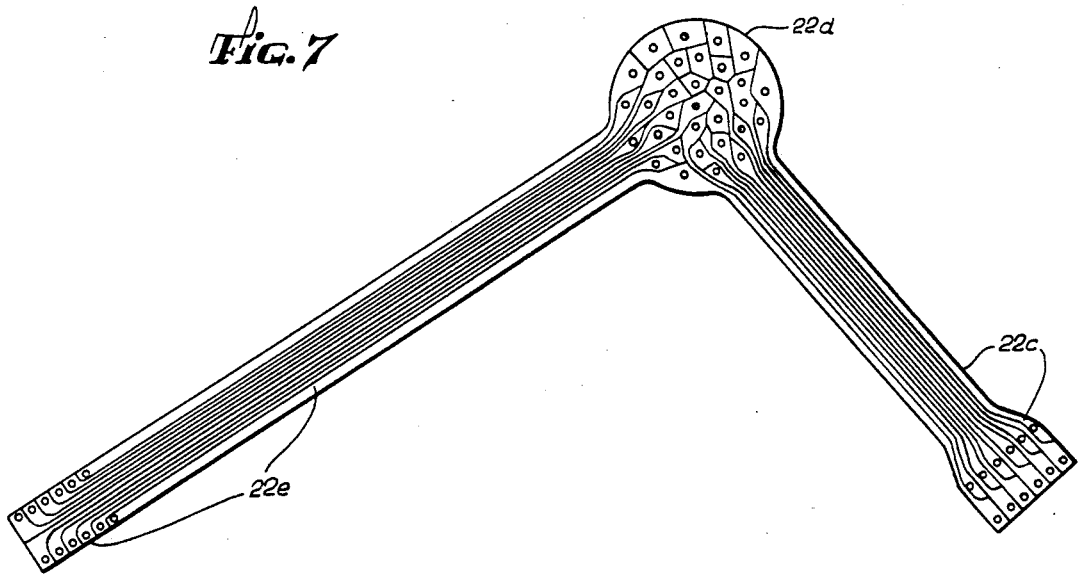
FIG. 7 is a plan view of an internal electrical wiring device used in the connector(s) of FIGS. 1 through 5.

The operational electrical interconnections between the detector 28 and emitter, on carrier 21a, and the electrical pin subassembly 18, are provided by the electronics on the other circuit boards or carriers 21b and 21c, and by pin receptacles 21d on circuit board 21c; and also by the interconnecting wiring devices 22a through 22d. These wiring devices, while appearing in FIGS. 2 through 4, are shown in much greater detail in FIGS. 7 and 8 and are discussed below in connection with those drawings.

Figure 9:
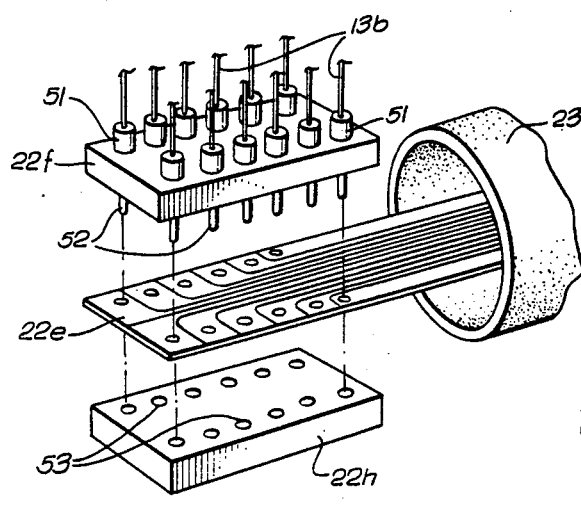
FIG. 9 is an analogous perspective view of a means of making electrical connections at another terminus of the wiring device of FIG. 7.
Figure 10:
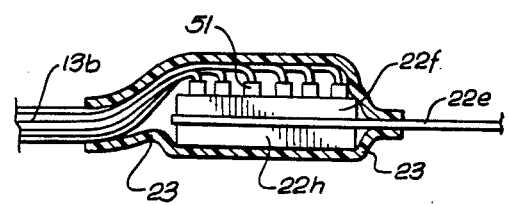
FIG. 10 is a section of the electrical connections in FIG. 9 after being dressed for protection against electrical shorting.

Returning to the second of the three elements of the cable 13, the six electrical twisted-wire pairs 13b are through-connected to the electrical pin subassembly 18 by interconnecting wiring devices 22d through 22h. (As may be recalled, these wires carry "locally" collected electrical impulses from sensors in the "local" part of the sensor array.) These devices, while appearing partially in FIGS. 2 through 4, are shown in greater completeness and detail in FIGS. 7, 9 and 10. As seen in FIGS. 2 and 10, the junction between the twisted-wire pairs 13b and the wiring device 22e is covered and protected by conventional "shrink tubing" 23.

The interconnecting wiring devices consist of a "flex circuit" (FIG. 7) that is custom formed with portion 22d that mates to the inside face of the electrical pin subassembly 18, an arm 22c that leads to the circuit board or carrier 21c, and another arm 22e that leads to the junction with the twisted-wire pairs 13b.

Figure 8:
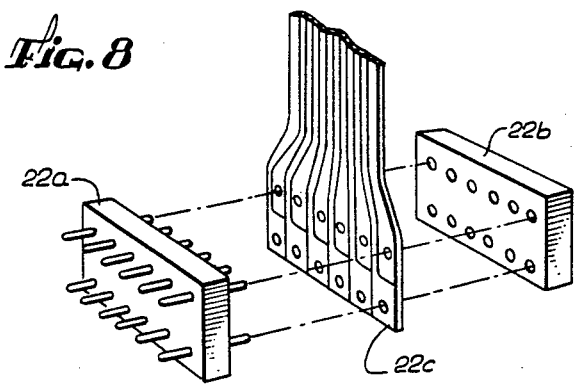
FIG. 8 is a perspective view, greatly enlarged relative to FIG. 7, of a means of making electrical connections at one terminus of the wiring device of FIG. 7.

The portion 22d of the flex circuit is wave-soldered to the pins of the electrical pin subassembly 18. The arm 22c is adapted for connection to the circuits on carrier 21c by a through-pin connector 22a (FIG. 8). Its pins at one end are soldered to the arm 22c and protected by a small cap 22b, and the same pins at the other end plug into the receptacles 21d (FIG. 3) on the carrier 21c. The arm 22e is adapted for connection to the twisted-wire pairs by another connector 22f, which may be obtained by modifying a conventional integrated-circuit receptacle—as by slightly trimming the pins 52. Those pins may then be soldered to the connection points on arm 22e, and protected by a cap 22h whose holes 53 receive the trimmed ends 52 of the connector 22f. The other ends of the pins are configured as individual wire receptacles 51, and are readily used to receive solder connection of the twelve wires 13b from the cable.

The "shrink tubing" 23 (FIG. 9) is then slid into place along the wiring, and in due course shrinks to snugly protect the junction as shown in FIG. 10.

Returning to the third element of the cable, the strength member 13c is wrapped around a stanchion 25c. The stanchion is supported between anchors 25a and 25b, that are fixed to the inside of the housing 11 by screws 27a and 27b. The loose end of the strength member 13c, on the other side of the "wrap" from the cable proper, is secured by leading it around one mounting screw 27a, between two washers 26 provided on that particular mounting screw 27a for the purpose.

Alternatively the loose end of the strength member may be secured by forming a knot 32 (FIG. 5) in the strength member and covering the knot and stanchion tightly with a clip 33, moved into position along lines of motion 34.

2. ELECTRONIC FEATURES

Figure 11:
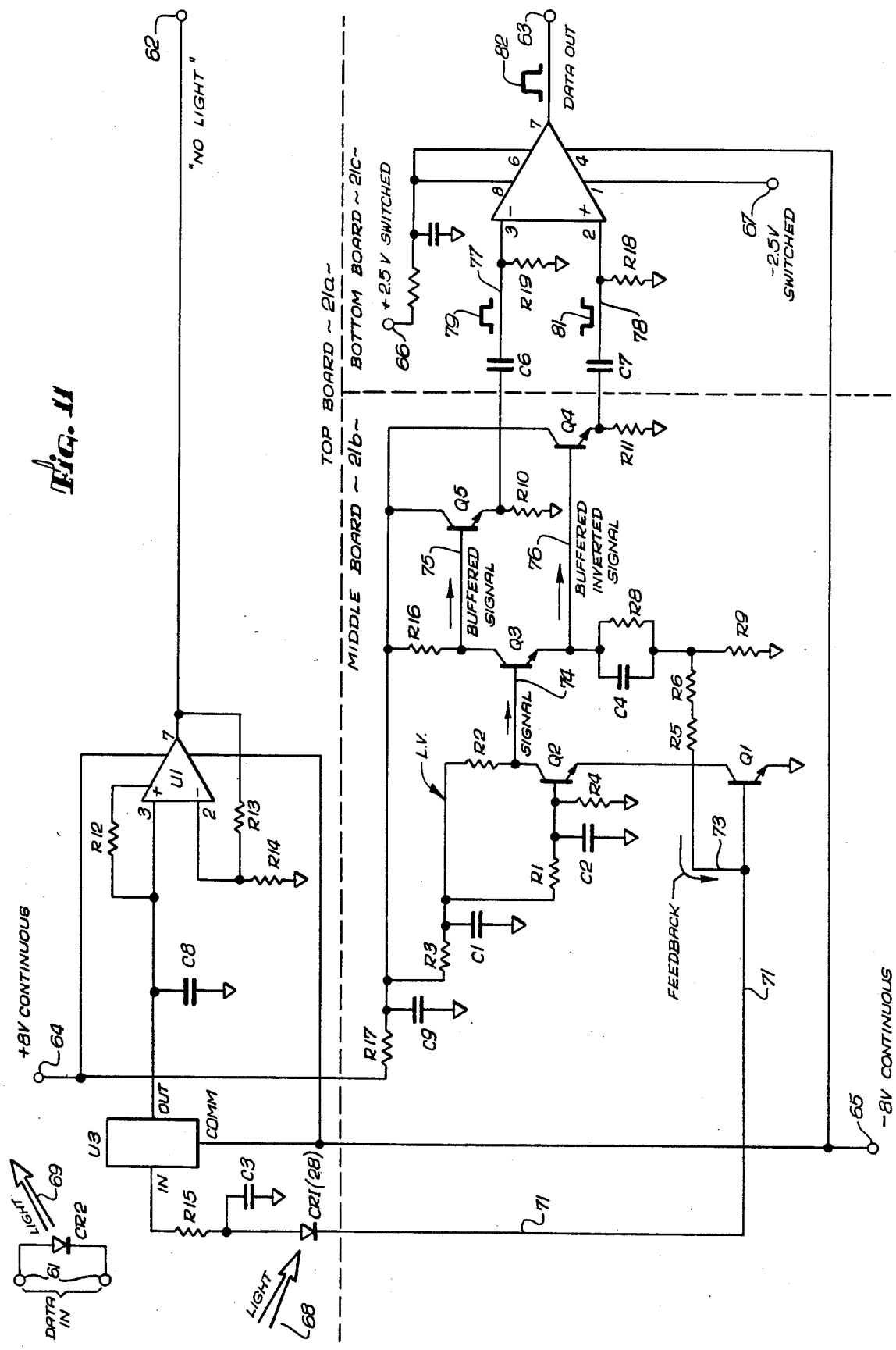
FIG. 11 is an electronic schematic of the circuit components shown in FIGS. 2 through 4 and FIGS. 6 through 10.

As shown in FIG. 11, the electrical connections to the light emitter CR2 consist simply of "DATA IN" leads 61. These leads run between the emitter and the electrical pin subassembly, via the flex circuit and related components illustrated in FIGS. 7 and 8.

The emitter, which may be of the type known commercially by the number SE 3352, produces light of wavelength approximately 820 nm—in "fast"-response pulses that accurately track in time the pulsing of electrical current applied to the emitter input terminals 61. These optical signals 69 proceed to the "sending" optical fiber 13d discussed earlier.

Optical signals 68 from the "receiving" optical fiber 13e strike the detector CR1, which may be identified as detector 28 of FIGS. 2 through 4. This component is advantageously a so-called PIN photo diode, such as Honeywell SD 4323. It produces current in response to impingement of light at wavelength approximately 820 nm from the emitter.

The power-supply line from this detector CR1 is used to derive a status "NO LIGHT" signal 62, as follows.

The current drawn through supply resistor R15 is in effect dc-filtered by capacitor C3, so that optical-signal-frequency changes in current do not reach the fourfold current multiplier U3. Changes in the dc current through the detector CR1, however, do reach the multiplier U3 and are amplified—and further filtered by capacitor C8—for presentation to very-high-gain amplifier U1. The gain of the latter is so high that it responds simply with a state change whenever the dc current component crosses a certain threshold level. The latter is selected to clearly identify the presence or absence of an optical-signal pulse train.

The collector side of the detector CR1 directs current pulses, corresponding to the information content of the optical pulse train from the "receiving" fiber, to the base of transistor Q1. This transistor is part of a high-gain amplifier that also includes transistors Q2, Q3, Q4 and Q5, and operational amplifier U2.

It is desirable to avoid appearance of a sizable voltage drop at the effective capacitor between the base and collector of input-stage transistor Q1: due to the return of feedback at point 73 to the Q1 base, such a voltage drop would be subject to the multiplying effect of the first three stages of the amplifier, and this would lead to instability or other undesirable effects. Accordingly the zero-gain amplifier stage Q2 is provided in "cascade" configuration, forcing the voltage drop that would otherwise appear between base and collector of Q1 to appear instead between base and collector of Q2—where there is no gain, and therefore no multiplying effect.

The filter composed of resistor R17 and capacitor C9 provides filtered voltage for use throughout the "middle" circuit board 21b, using the positive 8 V supply at 64—that also services the status-code circuitry described earlier. The second filter, composed of resistor R3 and capacitor C1, provides a low voltage ("L.V.") for operation of the zero-gain stage Q2; and resistors R1 and R2 with capacitor C2 provide biasing for that same stage.

The amplified signal taken off below the load resistor R2 proceeds at 74 to the base of third stage Q3, which is used to form both a buffered signal at 75 and an inverted buffered signal at 76. The latter signal, with suitable filtering and level adjustment by capacitor C4 and resistors R5, R6, R8 and R9, is used to provide the feedback signal 73 mentioned earlier. As will now be described, however, the buffered inverted signal 76 is also used in conjunction with the buffered signal 75 to form the "DATA OUT" pulses 82, for presentation at terminal 63 to the electrical pin subassembly and through it to the receiving apparatus.

The buffered signal at 75 is further buffered at stage Q5, and ac-coupled at C6 to the negative input terminal 3 of final-stage differential amplifier U2. The inverted buffered signal at 76, similarly, is further buffered at stage Q4 and ac-coupled to the positive input terminal 2 of amplifier U2. The waveforms 79 and 78 in these two signal channels are the same size—and, as suggested symbolically, the subtractive process in the differential power amplifier makes use of both signals to produce a composite at 82 that is double the amplitude it would be if only one signal were used.

While the positive and negative "8 V CONTINUOUS" power supplies at 64 and 65 (coming from the receiving apparatus to which the connector is mated) are turned on and left on when the apparatus and cable assembly are deployed in the field, the circuits powered by these supplies draw very little current, so field power is conserved. When the "NO LIGHT" status signal at 62 indicates to the receiving apparatus that an optical pulse train is arriving, the receiving apparatus actuates the positive and negative "2.5 V SWITCHED" supplies, to energize the output power stage U2—which is the only relatively high-drain stage in the unit.

Satisfactory commercial component designators for the parts shown in FIG. 11 are as follows.

| U1 LM4250CN | C1 0.1 microfarad | R1 20 k | R11 4.7 k |
|---|---|---|---|
| U2 CMP05 | C2 0.1 microfarad | R2 2.2 k | R12 2 M |
| U3 TL014 | C3 0.2 microfarad | R3 50 ohm | R13 1 M |
| | C4 0.1 microfarad | R4 10 k | R14 100 k |
| Q1 CA3127 | C6 0.1 microfarad | R5 10 k | R15 20 k |
| Q2 CA3127 | C7 0.1 microfarad | R6 10 k | R16 500 ohm |

-continued

| Q3 CA3127 | C8 0.068 microfarad | R7 5 k | R17 10 ohm |
|---|---|---|---|
| Q4 CA3127 | C9 47. microfarad | R8 2.2 k | R18 2 k |
| Q5 CA3127 | C10 47. microfarad | R9 500 ohm | R19 2 k |
| | | R10 4.7 k | R20 10 ohm |

3. SYSTEM FEATURES

FIG. 12 shows very symbolically the usage of the cable assembly of our invention in a field context. Blocks 71 and 72 represent two "remote data units" in a series of numerous such units, with the next "upstream" unit in the series being off the diagram to the left and the next "downstream" unit being off the diagram to the right.

The "receiving" electrical connector means of the two units are at 71a and 72a respectively, and the "sending" electrical connector means are at 71b and 72b respectively.

As shown, the connector assembly of FIG. 1 is disposed to interconnect these two data units 71 and 72. That assembly consists of the connector 10, identical connector 10a, and cable 13. Within the sheathing of cable 13 are the optical fiber 13e that is in active use, and the unused optical fiber 13d (provided in case the cable connections were reversed). Also within the cable are six twisted-wire pairs that were identified as 13d in FIGS. 2 through 4 and here are identified as 13i through 13n.

The wire pair 13i is used to provide a common ground between the several remote data units, and also to provide test circuits. The wire pair 13j is used as a spare: in the field it may serve as an audio intercom line, or to replace another twisted-wire pair that has developed a fault.

Four wire pairs 13k through 13n collect data from the eight arrays 75a, through 75h, respectively, of "geophones"—i.e., seismic (or analogous) sensors. Each of these arrays advantageously consists of eight geophones or the like along a linear two-wire cable; thus all the geophones in each array simply provide additive information for a geologically small portion of the research field in question. The geophones in each array may, for example, be twelve feet apart. Allowing for the twelve-foot spacing between the last geophone in each array (such as 75a) and the first geophone in the next array (such as 75b), the electrical "takeouts" 74a through 74h are therefore, for the exemplary embodiment shown, about 120 feet apart along the cable 13.

By interrupting the continuity of the twisted-wire pairs at the seven break points 76a through 76g, as shown, the four pairs can be used to service all eight of the geophone arrays. With a change of scale in this symbolic drawing at the point where the last geophone array 75h passes the remote data unit 72, it may be understood that there is no interruption of the series of arrays at the points where the remote data units are placed.

Another substantially identical cable assembly 13', with connector 10' connected to connector means 71a, is indicated in the upstream (left) end of the diagram, and yet another substantially identical assembly 13'', with connector 10a' connected to connector means 72b, is indicated in the downstream end of the diagram. The portion of the wire pair 13n within the cable that runs between break points 76a and 76g is simply unused, as are the portion of wire pair 13m between break points 76b and 76f, and the portion of wire pair 13L between break points 76c and 76e.

It is to be understood that all of the foregoing detailed descriptions are by way of example only, and not to be taken as limiting the scope of our invention—which is expressed only in the appended claims.

We claim:

1. A bidirectional cable assembly that links a first and a second apparatus which intercommunicate over wide geographical separations on land by respectively transmitting and receiving electrical signals to and from said cable assembly, which cable assembly is subject to being laid out over such wide geographical separations with either end adjacent to such receiving apparatus, and such first and second apparatus having respective electrical connector means for mating with said cable assembly to effect such transmitting and receiving; said cable assembly comprising:

a cable having throughout its length two substantially indentical optical fibers for transmitting optical signals along the length of the cable, and having along its length exterior protective elements; and two substantially identical connectors, one at each end of the cable, and each connector comprising:
a connector housing,
a light emitter mounted within the housing,
a light detector mounted within the housing,
an electrical pin subassembly adapted to mate with such electrical connector means of such apparatuses,
means for optically coupling the optical fibers to the emitter and detector in such fashion that the emitter of each connector is optically coupled via one optical fiber to the detector of the other connector, and
operational electrical connections between the emitter and the pin subassembly, and between the detector and the pin subassembly; and the cable assembly being substantially symmetrical, and fully operational regardless of which connector means are attached to such receiving apparatus.

2. The bidirectional cable assembly of claim 1, particularly for installation under field conditions characterized by mechanical shocks applied to the connector housing during preparation for use; and also comprising in each connector housing:

two alignment guides that are well within and distinct from the housing, and that are adapted to be accurately and stably positioned relative to the detector and emitter respectively, extending into the connector housing one end of the cable, with the exterior protective elements removed from a portion of the cable within the housing so that the optical fibers are bared along a portion of their length within the housing near their ends;

two positioning ferrules that are well within and distinct from the housing, and that are respectively secured directly to the ends of the respective fibers but with the end faces of the fibers exposed, and adapted to removably mate with and be secured relative to the respective alignment guides to effect quick but accurate and stable alignment of the fiber end faces with the detector and emitter respectively;

whereby the detector and emitter are secured to their respective alignment guides but are readily separated therefrom for replacement of the detector or emitter, or for replacement of such fiber; and whereby the detector, emitter, and alignment guides, and the fiber end-faces within the housing, are protected against damage due to deformation of the housing.

3. The bidirectional cable assembly of claim 1 wherein:

the emitter is adapted to generate optical signals in response to such electronic signals received from one of such apparatuses via its corresponding such connector means, via the connector pin subassembly, and via the operational electrical connections; and is adapted to apply such optical signals to a corresponding one of the optical fibers;

the detector is adapted to generate electrical signals in response to optical signals received from a corresponding one of the optical fibers, and to apply such electrical signals to the corresponding operational electrical connections for transmission via the corresponding connector pin subassembly to the other of such apparatuses via its corresponding connector means;

the operational electrical connections between the detector and pin assembly in each connector comprise active electronic circuitry for preprocessing such electrical signals from the detector and applying such electrical signals after the preprocessing to the pin subassembly.

4. The invention of any one of claims 1 through 3, wherein maintenance of proper alignment of each detector relative to the optical fiber coupled thereto is important to reliable signal transmission, said invention being for use under field conditions wherein the cable is subject to tensile force during installation; and said invention further comprising:

as part of the cable a strngth member that bears substantially all of any tensile force applied along the cable; and firmly fixed within the respective housing of each connector:
a stanchion adapted for operational engagement with the strength member so as to bear any tensile force that may be applied between that connector housing and the cable; and
means for securing the strength member to the stanchion;

whereby such tensile force applied between either connector housing and the cable is prevented from disturbing the alignment of the detector in that housing relative to the optical fiber coupled thereto.

5. A connector for terminating, and for receiving optical signals from, a first end of an optical-fiber cable, and for mating with signal-receiving electrical connector means of a receiving apparatus adapted to utilize information content of such optical signals, under field conditions characterized by crosstalk within such receiving apparatus or environmentally imposed electromagnetic interference with electrical signals; such cable being juxtaposed at a far second end to an operative emitter of such optical signals, and such emitter being actuated by electrical signals received from signal-sending electrical connector means of a sending apparatus adapted to provide such electrical signals having such information content; such cable having exterior protection along its length but such exterior protection being removed near the first end of such cable so that within said connector a short length of an optical fiber extends bared from the end of such cable, such optical fiber having an end face at such first end at which such optical signals from such emitter appear; said connector comprising:

a housing;

a detector supported within the housing and adapted to receive such optical signals from such end face and to generate further electrical signals in response to such optical signals;

active electronic circuitry immediately adjacent to the detector within the housing and intimately interconnected with the detector by an electrical signal path that is entirely enclosed within the housing, for preprocessing such further electrical signals from the detector, said housing being sized to accommodate the circuitry therein; and an electrical pin subassembly fixed to the housing, electrically connected to receive such further electrical signals, that have been preprocessed by the active electronic circuitry, and adapted to mate with such signal-receiving electrical connector means of such receiving apparatus, for coupling such further electrical signals that have been preprocessed to such signal-receiving electrical connector means; and also to carry electrical power from such signal-receiving electrical connector means of such receiving apparatus to energize the circuitry within the housing;

whereby such crosstalk is minimized by the preprocessing of such further signals before entry into such receiving apparatus; and whereby such electromagnetic interference is minimized by the extreme shortness of the electrical signal path traveled by said further electrical signals before said preprocessing, and by the enclosure of the said electrical signal path entirely within the housing.

6. The connector of claim 5, particularly for installation under field conditions characterized by potential for damage to such cable, and by mechanical shocks applied to the connector housing, during preparation for use; and also comprising:

an alignment guide that is well within the housing, and relative to the housing is a discrete mechanical part, and that is accurately and stably positioned relative to the detector; and a positioning ferrule that is well within the housing, and relative to the housing is a discrete mechanical part, and that is secured directly to the first end of such fiber but with such end face of such fiber exposed, and adapted to mate with and be secured relative to the alignment guide to effect quick but accurate and stable alignment of such fiber end face with the detector;

whereby the alignment guide and detector are secured together but are readily separated for replacement of the detector or of such fiber in event of damage; and whereby the housing, the alignment guide and the positioning ferrule, by virtue of their discrete character, cooperate to protect the detector, the alignment guide, and the fiber end-face within the housing against damage due to deformation of the housing.

7. The connector of claim 6, also comprising:

carrier means contained within and distinct from the housing and supporting the alignment guide, and adapted to support the detector in fixed mutual relation to the alignment guide, the detector and alignment guide being both carried on the carrier means.

8. The connector of claim 7, wherein:

the carrier means are also adapted to support the active electronic circuitry in fixed mutual relation immediately adjacent to the detector and to support electrical leads that effect the said intimate interconnection between the circuitry and the detector;

the carrier means also carry electrical power from such signal-receiving electrical connector means to energize the circuitry; and the electronic circuitry too is carried on the carrier means;

whereby the carrier means provide said intimate interconnection in a particularly stable form and enhance minimization of such crosstalk and other electromagnetic interference.

9. The connector of claim 5, also including such cable.

10. The connector of claim 9, also including such emitter operatively juxtaposed to transmit such optical signals to and along the cable.

11. A signal-transmission assembly, for receiving electrical signals from a sending apparatus adapted to provide such electrical signals having information content, and for transmitting such signals to a receiving apparatus adapted to utilize such information content, under field conditions characterized by crosstalk within such receiving apparatus, and characterized by environmentally imposed electromagnetic interference with electrical signals, which assembly is subject to being installed between such sending and receiving apparatuses with its ends reversed; said assembly comprising:

an optical-fiber cable having two substantially identical optical fibers therein, each of the fibers having exterior protection along its length but the exterior protection being removed near each end so that a short length of that fiber extends bared from that end, and each said optical fiber having at one end a first end-face adapted to receive optical signals and at the other end a second end-face adapted to project such optical signals from within the optical fiber;

two substantially identical and interchangeable connectors, one at each end of the optical-fiber cable, each of the two connectors comprising:

a housing;

an electrical pin subassembly fixed to the housing, electrically connected to receive such electrical signals from such a sending apparatus; and electrically connected to conduct electrical signals to such a receiving apparatus, and also to carry electrical power from such a receiving apparatus to energize the circuitry within the housing;

an optical emitter supported within the housing, and connected to receive such electrical signals from the pin subassembly and to generate optical signals in response thereto, and disposed to direct the optical signals into the first end-face at said one end of one of the two optical fibers;

detector supported within the housing and adapted to receive the optical signals from the second end-face at the other end of the other of the two optical fibers, and to generate further electrical signals in response to the optical signals;

active electronic circuitry immediately adjacent to the detector within the housing and intimately interconnected with the detector by an electrical signal path that is entirely enclosed within the housing, for preprocessing the further electrical signals from the detector; said housing being sized to accommodate the circuitry therein;

operative electrical connections between the circuitry and the electrical pin subassembly, for coupling the preprocessed further electrical signals from the circuitry to the pin subassembly, and also for carrying electrical power from the pin subassembly to energize the circuitry within the housing;

a first alignment guide accurately and stably positioned relative to the emitter;

a first positioning ferrule secured to the one end of the one fiber but with the first end-face of the one fiber exposed, and the first ferrule being adapted to mate with and be secured relative to the first alignment guide to effect quick but accurate and stable alignment of the one end-face of the one fiber with the emitter;

a second alignment guide accurate and stably positioned relative to the detector;

a second positioning ferrule secured to the other end of the other fiber but with the second end-face of the other fiber exposed, and the second ferrule being adapted to mate with and be secured relative to the second alignment guide to effect quick but accurate and stable alignment of the end-face of the other fiber with the detector; and carrier means contained within the housing and supporting the emitter and the first alignment guide in fixed mutual relation, and supporting the detector and the second alignment guide in fixed mutual relation; and wherein the two ends of each optical fiber are disposed relative to the emitters and detectors of the two connectors so as to transmit such optical signals from the detector of one connector to the emitter of the other connector;

wherein the assembly is fully functional regardless of which cable end is attached to such sending apparatus and which end is attached to such receiving apparatus;

wherein such crosstalk is minimized by the preprocessing of the further signals before entry into such receiving apparatus; and wherein such electromagnetic interference is minimized by the immediate adjacency of the detector relative to the electronics, and by the enclosure of the said electrical signal path entirely within the housing.

12. The invention of claim 11, wherein maintenance of proper alignment of each detector relative to the optical fiber coupled thereto is important to reliable signal transmission, said invention being for use under field conditions wherein the cable is subject to tensile force during installation; and said invention further comprising:

as part of the cable a strength member that bears ubstantially all of any tensile force applied along the cable; and firmly fixed within the respective housing of each connector:

a stanchion adapted for operational engagement with the strength member so as to bear any tensile force that may be applied between that connector housing and the cable; and means for securing the strength member to the stanchion;

whereby such tensile force applied between either connector housing and the cable is prevented from disturbing the alignment of the detector in that housing relative to the optical fiber coupled thereto.

13. The invention of claim 12, wherein the optical fibers are cemented into the corresponding positioning ferrules.

* * * * *